United States Patent [19]

Keske

[11] 4,004,471
[45] Jan. 25, 1977

[54] DIFFERENTIAL WITH SPHERICAL BEARING SUPPORTED PINIONS

[75] Inventor: Frank E. Keske, Chillicothe, Ill.

[73] Assignee: Caterpillar Tractor Co., Peoria, Ill.

[22] Filed: Mar. 28, 1975

[21] Appl. No.: 563,270

[52] U.S. Cl. .................................. 74/714; 74/710.5
[51] Int. Cl.² ...................... F16H 1/42; F16H 1/44
[58] Field of Search ................. 74/710.5, 714, 713, 74/410, 715

[56] References Cited

UNITED STATES PATENTS

| 1,742,385 | 1/1930 | Flanders | 74/410 |
| 2,270,567 | 1/1942 | Slider | 74/714 |
| 2,490,146 | 12/1949 | Miller, Jr. | 74/713 X |
| 3,406,592 | 10/1968 | Von Kaler | 74/413 X |

FOREIGN PATENTS OR APPLICATIONS 878,077  9/1961  United Kingdom .............. 74/710.5

Primary Examiner—Leonard H. Gerin
Attorney, Agent, or Firm—Phillips, Moore, Weissenberger, Lempio & Strabala

[57] ABSTRACT

A limited slip differential comprises a pair of face gears operatively connected together for relative rotation by a plurality of pinions each rotatably mounted on a carrier. Each pinion is secured to a shaft having each of its ends rotatably mounted on the carrier by a spherical bearing means for providing a crowned bearing surface area contact upon imposition of loads thereon during differential operation.

6 Claims, 5 Drawing Figures

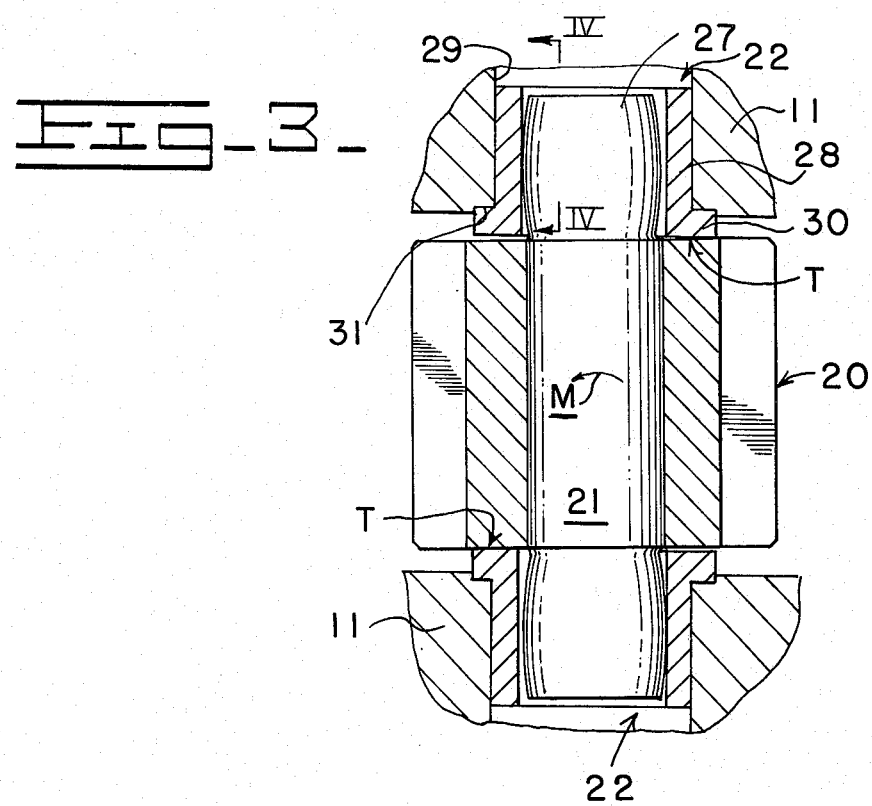
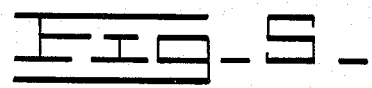
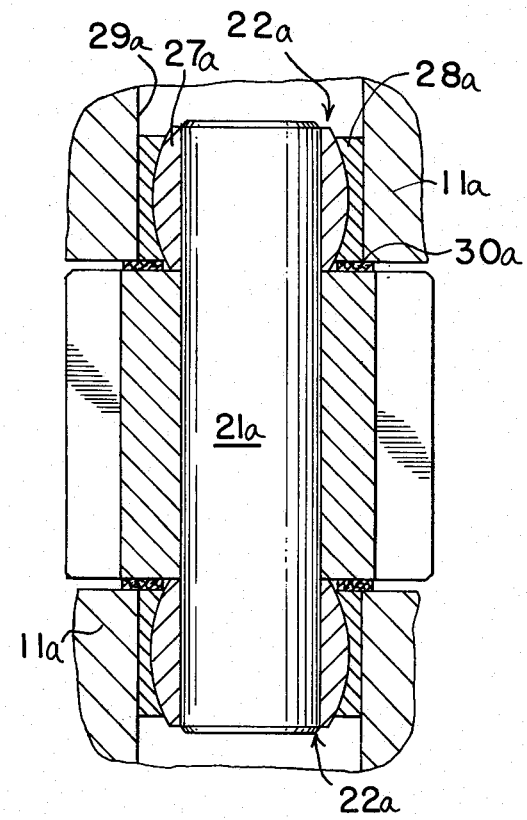
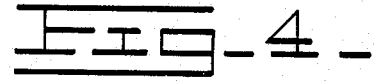
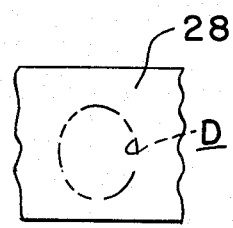

DIFFERENTIAL WITH SPHERICAL BEARING SUPPORTED PINIONS

BACKGROUND OF THE INVENTION

This invention relates to differentials of the type disclosed in U.S. Pat. No. 3,237,483, assigned to the assignee of this application, wherein a plurality of pinions are operatively engaged between a pair of opposed face gears. Each of the pinions is rotatably mounted on a carrier by a bearing assembly, normally comprising a sleeve bearing. Upon operation of the differential, considerable loads are imposed on the bearings to greatly reduce their service life.

In particular, the ends of the shaft carrying the pinion tends to tilt into point contact with the sleeve bearing to induce high unit loading thereat as a result of the overturning moment imposed on the pinions. Use of a conically shaped bearing sleeve of the type disclosed in U.S. Pat. No. 2,823,559, for example, will at best only provide a brief line contact between a respective end of the shaft and the bearing sleeve to thus also induce high unit loading therebetween.

SUMMARY OF THE INVENTION

An object of this invention is to overcome the above, briefly described problems by providing an economical spherical bearing means for mounting the shaft of a pinion on the carrier of a differential whereby a crowned bearing surface area contact is provided during differential operation. Such surface area contact has been found to greatly increase the service life of the bearing means and attendant structures, including the pinions.

BRIEF DESCRIPTION OF THE DRAWINGS

Other objects of this invention will become apparent from the following description and accompanying drawings wherein:

FIG. 3 is an enlarged view of the FIG. 1 spherical bearing means of this invention;

FIG. 4 is a view taken in the direction of arrows IV–IV in FIG. 3, illustrating deflection of a bearing employed in the bearing means upon loading thereof; and FIG. 5 is a view similar to FIG. 3, but illustrating a modification of the spherical bearing means of this invention.

DETAILED DESCRIPTION

Figure 1:
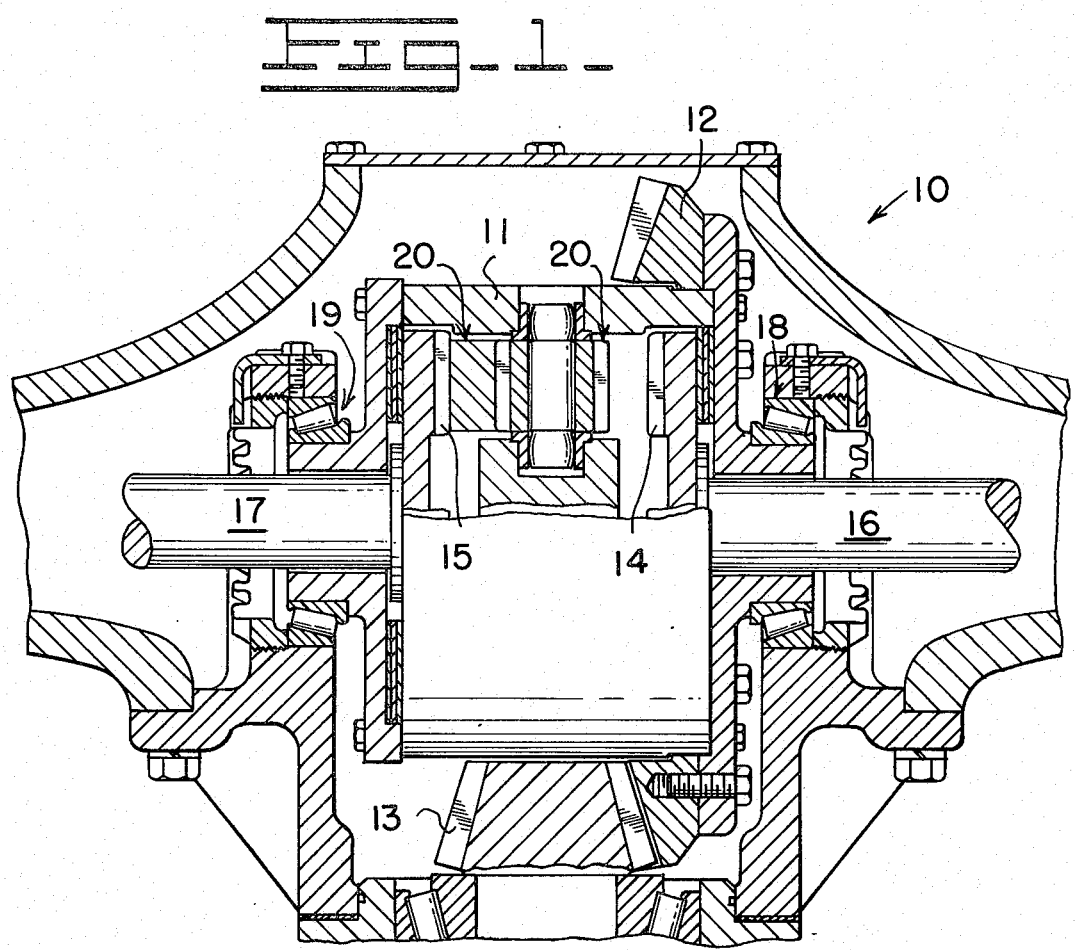
FIG. 1 is a cross sectional view of a limited slip differential employing the spherical bearing means of this invention on either end of each pinion-carrying shaft thereof.

FIG. 1 illustrates a differential 10 generally of the type disclosed in U.S. Pat. No. 3,237,483. The differential essentially comprises a carrier 11 having a bevel gear 12 secured thereto and adapted to be driven by an input pinion 13. A pair of opposed and longitudinally spaced helical face gears 14 and 15 are attached to axles 16 and 17 respectively, adapted to be operatively connected to the wheels of a vehicle (not shown). The carrier and axles are adapted for rotation by axially spaced roller bearing assemblies 18 and 19.

Four sets of three intermeshing pinion gear means or helical pinions 20 (two shown) mesh in interconnected relationship between the face gears for differentially permitting one of the face gears to rotate faster than face other gace gear. Each pinion is mounted on a shaft 21 having each end thereof rotatably mounted on the carrier by a spherical bearing means 22. As will be hereinafter more fully described, the spherical bearing means will function to provide a crowned bearing surface area contact therein upon imposition of loads on the pinion during operation of the differential.

Figure 2:
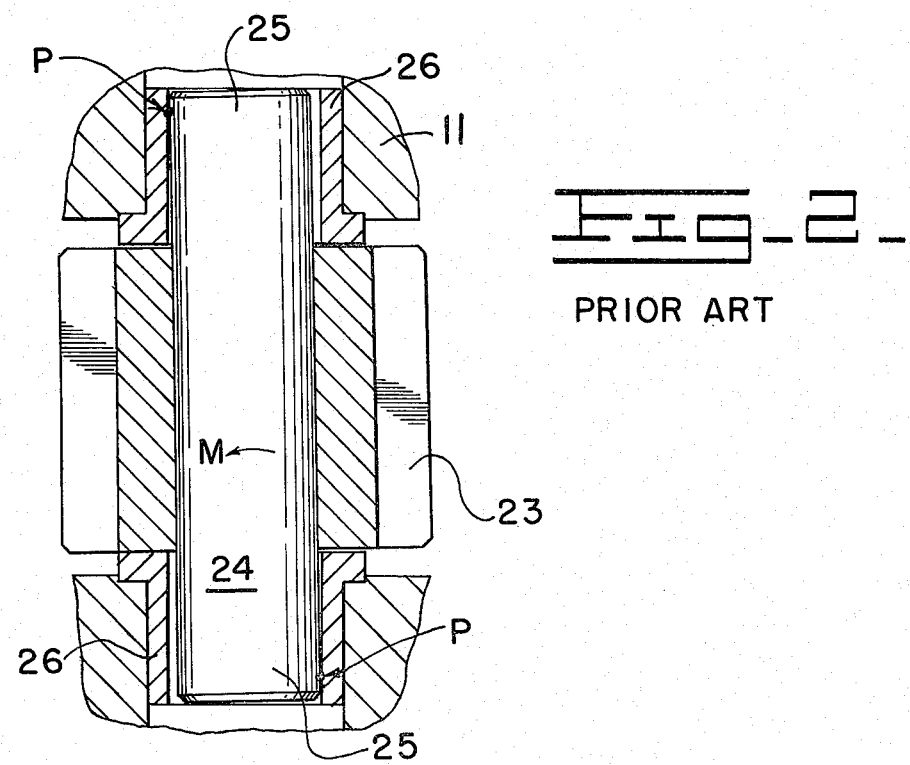
FIG. 2 is a cross sectional view of a conventional bearing mounting for a pinion-carrying shaft of a differential.

FIG. 2 illustrates a conventional helical pinion 23 mounted on a shaft 24 having opposite ends 25 thereof each rotatably mounted in a cylindrical sleeve bearing 26. During operation of the differential, a composite overturning moment M is imposed on the pinion and shaft which produces high unit loads on the ends of the shaft and bearings at points P. Such point loading will function to score and eventually render the sleeve bearing and pinion inoperative.

Referring to FIG 3, each spherical bearing means 22 of this invention comprises a semi-spherical surface 27 formed on each end of shaft 21 and a cylindrical sleeve bearing 28 suitably secured in a bore 29 formed in carrier 11. The shaft and sleeve bearing each preferably comprises a hardened steel. Upon operation of the differential, an overturning moment M is imposed on the pinion whereby each bearing 28 is deflected by semi-spherical surface 27 of shaft 21.

The crowned portion of shaft 27 that engages bearing 28 provides a relatively large contact surface therebetween for better distribution of the high unit loads imposed on the bearing, as shown in FIG. 4, the compression of bearing 28 below the yield strength of the bearing material results in the deflection D being of a generally elliptical shape. As the bearing "wears-in" this shape becomes the contact surface between the bearing and shaft.

Sleeve bearing 28 has an annular flange 30 formed on an inboard end thereof which seats a shallow annular groove 31 formed in carrier 11. The flange functions as a thrust bearing means, as indicated at arrow T, during differential operation.

FIG. 5 illustrates a modification of this invenion wherein like numerals depict constructions corresponding to those shown in FIG. 3, but with the numerals appearing in FIG. 4 being accompanied by an *a*. A helical pinion 20*a* is secured on a shaft 21*a* having its ends rotatably mounted on a carrier 11*a* by spherical bearing means 22*a*. Each bearing means comprises a self-aligning bearing, including a semi-spherical ball 27*a* mounted for limited pivotal movement in an annular slipper 28*a*, secured within a bore 29*a* formed in the carrier. The ball and slipper engage at a common and pre-tailored crowned bearing surface area and a common thrust plate 30*a* is disposed between each pinion and the carrier to provide a thrust bearing means thereat.

I claim:

1. In a differential of the type comprising a pair of opposed face gears, a rotatable carrier disposed between said face gears and a plurality of pinion gear means rotatably mounted on said carrier with at least some of said pinion gear means meshing with said face gears for differentially permitting one face gear to rotate faster than the other face gear, the invention wherein each of said pinion gear means is mounted on a separate shaft having each end thereof rotatably mounted on said carrier by a spherical bearing means for providing a crowned bearing surface area contact therein upon imposition of loads thereon during operation of said differential.

2. The differential of claim 1 further comprising thrust bearing means disposed between each of said pinion gear means and said carrier for counteracting axial movement of said shaft and pinion gear means upon operation of said differential.

3. The differential of claim 1 wherein each of said bearing means comprises a cylindrical bearing sleeve secured in a bore formed in said carrier and semispherical surface portions formed on a respective end of said shaft for engaging said bearing sleeve in said crowned bearing surface area contact upon operation of said differential.

4. The differential of claim 3 further comprising an annular flange integrally formed on an inboard end of said bearing sleeve and disposed between said carrier and said pinion gear means for providing a thrust bearing thereat.

5. The differential of claim 1 wherein each of said bearing means comprises a self-aligning bearing including a semi-spherical ball secured on a respective end of said shaft and an annular slipper secured in a bore formed in said carrier to engage said ball in said crowned bearing surface area contact.

6. The differential of claim 5 further comprising a common thrust plate disposed between each end of each of said pinion gear means and said carrier for providing a thrust bearing thereat.

* * * * *